United States Patent [19]

Berger

[11] 4,097,466

[45] Jun. 27, 1978

[54] LIQUID COATING COMPOSITIONS

[75] Inventor: Dieter Berger, Marl, Germany

[73] Assignee: Chemische Werke Huels Aktiengesellschaft, Marl, Germany

[21] Appl. No.: 686,483

[22] Filed: May 14, 1976

[30] Foreign Application Priority Data

May 17, 1975 Germany .............. 2522044

[51] Int. Cl.$^2$ ............................. C08G 63/12
[52] U.S. Cl. ............... 260/75 EP; 260/78.41; 260/835
[58] Field of Search ............... 260/75 EP, 78.41, 835

[56] References Cited

U.S. PATENT DOCUMENTS

| | | | |
|---|---|---|---|
| 3,862,093 | 1/1975 | Jellinek et al. | 260/75 EP |
| 3,912,690 | 10/1975 | Yapp | 260/75 EP |
| 3,979,477 | 9/1976 | Schmid et al. | 260/835 |
| 3,989,767 | 11/1976 | Homma et al. | 260/834 |

*Primary Examiner*—Lucille M. Phynes
*Attorney, Agent, or Firm*—Millen & White

[57] ABSTRACT

Liquid varnish coating compositions having a low or nil solvent content, comprising a mixture of binders and optionally conventional auxiliary agents, which contain, as the binder, a mixture of:

(A) glycidyl esters produced in the usual manner by the reaction of esterification products containing carboxyl groups with an excess of a 2,3-epoxyhaloalkane in the presence of reactive agents which split off hydrogen halide; and (B) one or more cyclic carboxylic acid anhydrides of saturated and/or unsaturated aliphatic and/or cycloaliphatic dicarboxylic acids or mixtures consisting essentially of carboxylic acid anhydrides of saturated and/or unsaturated aliphatic and/or cycloaliphatic and aromatic dicarboxylic acids, wherein the melting point of the anhydride or anhydride mixture and changes is below 100° C., in such an amount that 0.7–1.5 anhydride equivalents are present for one epoxide equivalent of the glycidyl esters.

10 Claims, No Drawings

LIQUID COATING COMPOSITIONS

BACKGROUND OF THE INVENTION

It is known to cure polyepoxides with carboxylic acid anhydrides or polyamines to obtain valuable thermosets used predominantly as coating and molding compositions. The heat-curing of polyepoxides with anhydrides, widely used for the production of molded materials, has not gained any importance for varnishes and coatings (cf. H. Kittel, "Lehrbuch der Lacke und Beschichtungen" [Varnish and Coating Textbook], vol. I, part 2 p. 632, publishers W. A. Colomb in Hennemann GmbH, Berlin-Oberschwandorf, 1973). According to this process, only brittle coatings are obtained. Such varnishes have no advantages whatever as compared to polyepoxide/amine varnishes. The polyepoxide/amine varnishes have, in turn, several grave disadvantages preventing the wider-spread use thereof. One disadvantage, which weighs heavily and cannot be eliminated, exhibited by the otherwise excellent coatings based on the very frequently employed low-molecular weight diglycidyl ether of 2,2-bis(4-hydroxyphenyl)propane (bisphenol A), with an epoxide equivalent of between 170 and 220, and polyamines (or polyamidoamines) is the lack of weathering resistance. Furthermore, such coatings are either relatively brittle or tend to become brittle.

Higher-molecular weight bisphenol A-bisepoxide type compounds yield coatings which, though more elastic, are likewise not weather-resistant and exhibit the additional disadvantage that they can be processed only with great amounts of solvents when used as liquid varnish coating agents due to the fact that their consistency is solid at room temperature. The solids content of such varnishes is, with a high degree of pigmentation, only 20–50% by weight. The use of considerable amounts of solvents, however, is uneconomical, since they generally cannot be recovered and must be eliminated by expensive procedures for reasons of ecology. The application of such solid binders in powder varnishes which are harmless to the environment has the disadvantage that especially expensive varnish production and varnishing methods must be utilized. Due to the impaired flow characteristics in case of powder varnishes, one must furthermore tolerate a poor optical surface quality.

Weathering-resistant thermosets are obtained by curing cycloaliphatic epoxides producible by the peroxide epoxidation of corresponding unsaturated compounds, e.g. 1-epoxyethyl-3,4-epoxycyclohexane or 3',4'-epoxycyclohexylmethyl-3,4-epoxycyclohexane carboxylate, as well as bisglycidyl esters of cycloaliphatic dicarboxylic acids, e.g. hexahydrophthalic acid bisglycidyl ester. However, they are in most cases used as electrocasting resins for molding compositions and have not gained any significance in varnish coating applications due to their special curing behavior and/or the brittleness of the cured products.

Numerous prior art teachings relate to polyesters which carry glycidyl groups. For example, polyesterpolycarboxylic acids are used for preliminary extension and hardening of polyepoxides, such as bisphenol A diglycidyl ethers or dicarboxylic acid diglycidyl esters, in order to obtain elastic cross-linking products. The polyesterpolycarboxylic acids used for the preparation of such products are prepared mostly from a diol and an aliphatic dicarboxylic acid, e.g. 1,6-hexanediol and sebacic acid in a molar ratio of 4:5; see DOS (German Unexamined Laid-Open Application) No. 1,720,427. The process of rendering commercial epoxy resins elastic, however, results in a markedly lower stability with respect to water and chemicals. Utilization of the very highly viscous, preliminarily extended epoxy resins takes place during the preparation of casting resins in the melt. Due to the large amount of solvent required, such epoxy resins are unsuitable for the non-polluting production of varnishes.

Polyglycidyl esters obtained by reacting polyesterpolycarboxylic acids with epichlorohydrin are hardly known, at least on a commercial scale. Although German Pat. No. 1,009,590 describes the reaction of a polyester of adipic acid and butanediol (molar ratio 3:2) with epichlorohydrin by way of the potassium salt, glycidylation takes place only to a very incomplete extent. In case of a more comprehensive reaction with epichlorohydrin, a glycidyl ester is obtained which, when cured with hexahydrophthalic anhydride, yields varnish films which are too soft. In British Patent 884,033 (Example 39), a mixture of an unspecified polyester and phthalic annydride is reacted with epichlorohydrin in the presence of a basic ion exchanger, thus obtaining an epoxide mixture with a high chlorine content which consequently is unsuitable as a varnish binder.

Furthermore, glycidyl esters with 2-6 epoxide equivalents per mole are conventional which have been obtained from low-molecular weight partial esters carrying carboxyl groups (mostly of a degree of polycondensation = 3) by reacting such esters with epichlorohydrin and an alkali in the presence of catalysts, e.g. see German Pat. No. 1,165,030; British Pat. No. 884,033; DOS No. 1,816,933; DOS No. 1,916,287; British Pat. No. 1,026,141; and DOS No. 1,643,789.

These acidic partial esters are produced by the esterification of one mole of a polyalcohol or polyether dialcohol (see, for example, German Pat. No. 1,904,110) with $n = 2-6$ hydroxy groups and $n$ (in most cases 2) moles of an aromatic, cycloaliphatic or aliphatic dicarboxylic acid and/or the anhydrides thereof. In this process, the hydroxy groups are partially or entirely esterified. It is known (see DOS 1,643,789) that molded articles prepared from anhydride-cured polyglycidyl esters of the partial esters of polyalcohols and aliphatic dicarboxylic acids exhibit poor mechanical properties, while replacement of the aliphatic dicarboxylic acids by aromatic or especially cycloaliphatic dicarboxylic acids, (e.g. hexahydrophthalic acid, $\Delta^4$-tetrahydrophthalic acid, and the methyl homologs thereof) results, in the case of glycidyl esters cured with hexahydrophthalic anhydride, in molded components having good to very good mechanical properties.

However, these good mechanical properties found in compact molded components do not hold true for thin layers and coatings on substrates, e.g. less than 10–200 $\mu$ in thickness. It was shown by comparative experiments that the use of these conventional glycidyl esters results in coatings of insufficient elasticity, and this also applied to coatings made from bisglycidyl esters of aromatic and cycloaliphatic dicarboxylic acids, e.g. isophthalic acid or hexahydrophthalic acid.

OBJECTS OF THE INVENTION

Accordingly, it is a general object of this invention to provide improved liquid varnish coating compositions having a low or nil solvent content.

Another object of this invention is to provide varnish coatings which simultaneously exhibit good mechanical properties, high weather resistance and good corrosion protection.

A further object of this invention is to provide liquid varnish coating compositions having a solvent content of only about 0–25% by weight which can be processed by conventional means with minimal emission of solvents into the atmosphere.

An additional object of this invention is to provide an improved binder for liquid varnish coating compositions.

Upon study of the specification and appended claims, further objects and advantages of this invention will become apparent to those skilled in the art.

SUMMARY OF THE INVENTION

Briefly, the above and other objects, features and advantages of the present invention are attained in one aspect thereof by providing a liquid varnish coating compositions having 0–25% solvent content, comprising a mixture of a binder and optionally conventional auxiliary agents, wherein the binder is a mixture of:

(A) glycidyl esters produced in the usual manner by the reaction of esterification products containing carboxyl groups with an excess of a 2,3-epoxyhaloalkane in the presence of reactive agents which split off hydrogen halide; and (B) cyclic carboxylic acid anhydrides of saturated and/or unsaturated aliphatic and/or cycloaliphatic dicarboxylic acids or mixtures consisting essentially of carboxylic acid anhydrides of saturated and/or unsaturated aliphatic and/or cycloaliphatic and aromatic dicarboxylic acids, wherein the melting point of the anhydrides or anhydride mixtures lies below 100° C., in such an amount that 0.7–1.5 anhydride equivalents are present for one epoxide equivalent of the glycidyl esters, by using in component (A) glycidyl esters containing 1.6–2.8 epoxide equivalents/mole and having epoxy numbers of 0.1–0.35 epoxide equivalents/100 g., OH-numbers of 20–130 mg. KOH/g., and average molecular weight of 600–2000; and by producing the glycidyl esters by the glycidylation of esterification products containing carboxyl groups and having acid numbers of 60–220 mg. KOH/g., OH-numbers of 0–100 mg. KOH/g., average molecular weight of 550–1800, and a degree of polymerization (=average number of monomer building blocks in a polyester molecule) of 4.8–15, wherein the esterification products containing carboxyl groups are obtained by a condensation of mixtures I and III, wherein mixture I consists of:

I. (a) 0–50 molar percent of one or more aliphatic polyols with 3 or 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are to be separated by at least 2 carbon atoms from each other and from the hydroxy groups, wherein optionally the mixture ii can also consist of a single aliphatic or cycloaliphatic diol meeting the above definition,
and wherein mixture III consists of:

III. (a) 15–40 molar percent of one or more saturated aliphatic dicarboxylic acids or 4–12 carbon atoms and/or the intramolecular anhydrides thereof and III. (b) 85–60 molar percent of one or more aromatic and/or cycloaliphatic dicarboxylic acids with 6 to 12 carbon atoms, preferably 6 carbon atoms, in the ringsystem wherein the carboxyl groups are arranged in the 1,2-, 1,3-or 1,4-position — except for terephthalic acid — and/or optionally the cyclic anhydrides thereof wherein optionally up to 30 molar percent of these dicarboxylic acids can be substituted by an aromatic polycarboxylic acid with more than 2 carboxyl groups, optionally in the form of the intramolecular anhydride thereof.

DETAILED DISCUSSION

The present invention provides novel binders, with which solvent-free or low-solvent content liquid varnishes can be prepared which can be processed without emission, or almost free from emission, to coatings having simultaneously good mechanical properties, a very high weathering resistance and good corrosion protection.

This problem is solved, in accordance with the invention, by using in component (A) glycidyl esters containing 1.6–2.8 epoxide equivalents/mole and having epoxy numbers of 0.1–0.35 epoxide equivalents/100 g., OH-numbers of 20–130 mg. KOH/g., and average molecular weight of 600–2000; and by producing same by the glycidylation of esterification products containing carboxyl groups and having acid numbers of 60–220 mg. KOH/g., OH-numbers of 0–100 mg. KOH/g., average molecular weight of 550–1800, and a degree of polymerization (=average number of monomer building blocks in a polyester molecule) of 4.8–15, wherein the esterification products containing carboxyl groups have been obtained by a condensation of mixtures I and III, wherein mixture I consists of:

I. (a) 0–50 molar percent of one or more aliphatic polyols with 3 or 4 hydroxy groups and 3–6 carbon atoms and I. (b) Correspondingly 100–50 molar percent of a mixture II of aliphatic and/or cycloaliphatic diols, wherein the hydroxy functions are separated by 2–12 carbon atoms and optionally up to 2 of the carbon atoms can be substituted by oxygen atoms which latter, in turn are to be separated by at least 2 carbon atoms from each other and from the hydroxy groups, wherein optionally the mixture II can also consist of a single aliphatic or cycloaliphatic diol meeting the above definition,
and mixture III consists of:

III. (a) 15–40 molar percent of one or more saturated aliphatic dicarboxylic acids of 4–12 carbon atoms and/or the intramolecular anhydrides thereof and III. (b) 85–60 molar percent of one or more aromatic and/or cycloaliphatic dicarboxylic acids with 6 to 12 carbon atoms, preferably 6 carbon atoms, in the ringsystem wherein the carboxyl groups are arranged in the 1,2-, 1,3- or 1,4-position — except for terephthalic acid — and/or optionally the cyclic anhydrides thereof wherein optionally up to 30 molar percent of these dicarboxylic acids can be substituted by an aromatic polycarboxylic acid with more than 2 carboxyl groups, optionally in the form of the intramolecular anhydride thereof.

The term low-solvent content is understood to mean, within the scope of the present invention, a coating composition containing at most 25% by weight of solvent, preferably less than 20%, and especially 5–20%.

The glycidyl esters of this invention can be prepared by conventionally reacting esters carrying carboxyl groups, produced from mixtures I and III and denoted hereinbelow as acidic esters, in one or several stages with a 2,3-epoxyhaloalkane while splitting off hydrogen halide. Primarily for economical reasons, the use of epichlorohydrin and/or β-methylepichlorohydrin is preferred.

The procedure can be conducted so that the alkali salts of the acidic esters are reacted at an elevated temperature with an excess of epichlorohydrin and/or β-methylepichlorohydrin, the product is filtered off from the thus-separated alkali chloride, and the excess epichlorohydrin and/or β-methylepichlorohydrin is distilled off, e.g., as described in DOS No. 1,901,995. However, this process is cumbersome, since the alkali salts of the esters must be separately produced in a preliminary stage and then dried.

Another possibility is to react the ester, in the form of the free acid, in one stage with an excess of epichlorohydrin to form the glycidyl ester in the presence of catalysts, e.g., tertiary amines, quaternary ammonium salts or anion exchange resins. During this reaction, the corresponding chlorohydrin ester is first obtained which, by reaction with the excess epichlorohydrin, is reepoxidized, forming the glycidyl ester and glycerol dichlorohydrin is distilled off with the epichlorohydrin after termination of the reaction and can be regenerated to epichlorohydrin by treatment with an alkali. An analogous reaction can also be effected with β-methylepichlorohydrin. Such a single-stage process is described in German Pat. No. 1,165,030 and British Pat. No. 884,033. The process has the disadvantage of yielding relatively impure products which, due to rather large proportions of chlorohydrin esters, have a comparatively low epoxy value (i.e. epoxide equivalents per 100 g.) and a high chlorine content.

The glycidyl esters of this invention are preferably produced by directly reacting epichlorohydrin with the acidic esters at 40°–125° C. in the presence of 0.001–1% by weight (based on the reaction mixture) of a catalyst, preferably a quaternary ammonium or phosphonium compound or a tertiary sulfonium compound, and treating the thus-formed chlorohydrin ester with agents to split off hydrogen halide, e.g., sodium hydroxide. Since the boiling point of the reaction mixture under normal pressure (about 1000 millibars) is approximately 125° C. maximum, excess pressure would have to be utilized when using higher reaction temperatures, requiring an unnecessarily high expenditure in apparatus. Reaction temperatures which are too low generally result in fine-grained sediments which are difficult to filter (these sediments consist of sodium chloride in case of using sodium hydroxide) and which impede working up of the reaction mixture. Larger amounts of catalyst are undesirable, inasmuch as the reaction is not any more accelerated thereby and an increasing discoloration of the reaction mixture can occur. In place of epichlorohydrin, it is also possible to use β-methylepichlorohydrin.

Suitable catalysts for the addition of epihalohydrin and/or β-methylepihalohydrin and also for splitting off the hydrogen halide include but are not limited to tertiary amines such as triethylamine, tripropylamine, benzyldimethylamine, N,N'-dimethylaniline and triethanolamine; especially quaternary ammonium bases, such as benzyltrimethylammonium hydroxide or choline; quaternary ammonium salts, such as tetramethylammonium chloride, tetraethylammonium bromide and benzyltrimethylammonium chloride; quaternary phosphonium salts, such as tetramethylphosphonium chloride and tetraphenylphosphonium bromide; tertiary sulfonium salts, such as trimethylsulfonium iodide and 2,3-epoxypropylmethylethylsulfonium iodide; and ion exchange resins with tertiary amine or quaternary ammonium groups.

The epichlorohydrin or β-methylepichlorohydrin is used in an excess of 3–20 moles, preferably 5–10 moles, per carboxyl group equivalent of the acidic esters. With the use of less than 3 moles of epichlorohydrin or β-methylepichlorohydrin, glycidyl esters are obtained which are too viscous and are incapable of forming low-solvent content varnishes; the use of more than 20 moles of epichlorohydrin or β-methylepichlorohydrin is uneconomical and furthermore does not result in any appreciable lowering of the resultant glycidyl ester viscosity.

Strong bases are normally utilized for the dehydrohalogenation, such as anhydrous sodium hydroxide or aqueous sodium hydroxide solution, preferably 25–50% by weight sodium hydroxide solution, or also correspondingly other strong bases, such as potassium hydroxide, calcium hydroxide, alkali carbonates or the aqueous solutions thereof. These bases can be added after or during the chlorohydrin formation.

An especially preferred process for the production of the glycidyl esters resides in uniformly adding, during the course of 1–3 hours, 25–50% aqueous sodium hydroxide solution (in a 10–50% excess) to the solution of the ester, boiling under normal pressure, in epichlorohydrin and/or β-methylepichlorohydrin, containing 0.001–0.1% by weight (based on the reaction mixture) of tetraethylammonium bromide or tetraphenylphosphonium bromide as the catalyst; during this procedure, the water is azeotropically removed from the reaction mixture by the epichlorohydrin or β-methylepichlorohydrin. After removal of the water, the epichlorohydrin or β-methylepichlorohydrin is again uniformly fed to the reaction mixture. It is, of course, also possible to conduct the reaction at lower temperatures and reduced pressure. After the sodium chloride has been filtered off, the solution is treated to remove the catalyst, advantageously with adsorbents according to the process of Czechoslovakian Pat. No. 119,415 patented Aug. 15, 1966 or of copending, commonly assigned U.S. patent application Ser. No. 563,163, filed Mar. 28, 1975, now abandoned, the contents of which are incorporated by reference herein.

Suitable such adsorbents include but are not limited to silica gel, aluminum oxide, bentonites, montmorillonite, bleaching clay or fuller's earth. The adsorbents can advantageously be added to the reaction mixture directly after termination of the dehydrohalogenation at room temperature. The sodium chloride and the adsorbent are then separated simultaneously by filtration.

By concentration of the solution, the glycidyl esters are generally obtained in yields of 90–100%. The epoxide content is normally between 70 and 90% of theory, and the chlorine content is generally only between 0.5 and 2.5% by weight.

The thus-obtained glycidyl esters have, on the average, 1.6–2.8, preferably 1.8–2.2 epoxide equivalents/mole calculated from the epoxy number and the molecular weight; epoxy numbers of 0.1–0.35, preferably 0.15–0.28 epoxide equivalents/100 g. determined by titration in chloroform with perchloric acid in the presence of excess tetraethylammonium bromide and glacial acetic acid, indicator crystal violet (=methylrosaniline chloride); OH-numbers of 20–130 mg. KOH/g., preferably 30–80 mg. KOH/g. determination by IR spectroscopy in tetrahydrofuran solution; and molecular weights (number average) of 600–2000, preferably 650–1500, determined by vapor pressure osmosis in chlorobenzene. With an epoxide content in the glycidyl esters of below 1.6 epoxide equivalents/mole, only slightly cross-linked coatings result during curing with anhydrides, which coatings have only a minor corrosion protection effect, while glycidyl esters with more than 2.8 epoxide equivalents/mole are of an undesirably high viscosity and yield, when cured with anhydrides, coatings of unacceptably low elasticity.

The acidic esters required for the reaction with 2,3-epoxyhaloalkanes can be obtained according to conventional esterification methods, such as melt condensation or azeotropic condensation, e.g., see Houben-Weyl, "Methoden der organischen Chemie" (Methods of Organic Chemistry), vol. XIV/2, Georg Thieme publishers, Stuttgart, 1963, wherein the molecular weight and the degree of polymerization of the esters are controlled conventionally by the selection of the monomeric components employed, their molar ratio and the degree of conversion during esterification.

In particular, condensation is conducted in the melt in one or two stages at temperatures of 130°–250° C., preferably 130°–200° C., wherein the desired degree of conversion is determined by controlling the acid number determined by titration with an aqueous sodium hydroxide solution in acetone solution. In the single-stage process, all monomeric components (polyols and polycarboxylic acids) are simultaneously esterified until the desired degree of conversion has been reached; in the two-stage process, the polyols are first employed in a molar excess as compared to the polycarboxylic acids and condensed to a polyester polyalcohol having an acid number of $\leq 5$ mg. KOH/g. in the first stage, which is reacted in the second stage with the remainder of the polycarboxylic acids, optionally with the cyclic anhydrides thereof, to obtain the acidic ester until the desired degree of conversion has been attained. Examples for melt condensations of several esters are found in DOS Nos. 1,816,096; 1,643,789; and 2,019,282.

The esters are condensed until acid numbers of 60–220, preferably 100–220 mg. KOH/g. are obtained, with a polymerization degree of 4.8 – 15, preferably 5 – 9, and molecular weights (number average) of 550–1800, preferably 600–1200. The resultant OH-numbers of the esters are 0–100 mg. KOH/g., preferably 10–60 mg. KOH/g. The OH-numbers and molecular weights are determined in the same manner as in case of the glycidyl esters.

Acid numbers of the esters above 220 mg. KOH/g. lead, in the corresponding glycidyl esters, to an epoxide content of more than 2.8 epoxide equivalents/mole and thus to the above-enumerated disadvantages, whereas if the acid numbers of the esters are below 60 mg. KOH/g., glycidyl esters result having too low an epoxide content (<1.6 epoxide equivalents/mole). With a degree of polymerization of the esters above 15, glycidyl esters are obtained which are too viscous and can no longer be used as binders in low-solvent content varnishes, whereas degrees of polymerization below 4.8 lead to a decrease in the corrosion protection effect of the corresponding glycidyl ester coatings. Increases in viscosity are incurred in the corresponding glycidyl esters in case of OH-numbers of above 100 mg. KOH/g., as well as molecular weights of more than 1800 in the esters, making it difficult to process same in varnishes with low solvent content. In the case of molecular weights above 1800, the corresponding glycidyl ester coatings show only a weak degree of cross-linking, resulting in a decrease of the coating hardness.

Low condensation temperatures (130°–190° C.) lead to longer condensation times, but have the advantage when acidic esters with a considerable hydroxy group content are condensed in a single stage that the condensation can be terminated in a reproducible fashion at the desired acid number of the ester by rapid cooling. If, in the two-stage condensation, anhydrides are employed in the second stage, the temperature should not exceed 170° C. in the second stage, since at above 170° C. side reactions including a sublimation of the anhydrides occur.

Suitable polyols to be utilized according to I. (a) include but are not limited to 1,1,1-trimethylolpropane, 1,1,1-trimethylolethane, 1,2,6-hexanetriol, glycerol and pentaerythritol. The aforementioned polyols are employed in amounts of 0–50 molar percent, preferably 5–50 molar percent and especially 10 – 40 molar percent. When a greater amount of these polyols is utilized in the process, esters are obtained wherein the glycidylation leads to undesirably high-viscosity glycidyl esters. At least 5 molar percent of these polyols reduces the condensation times and, due to the fact that the hydroxy group content is higher in such cases, can result in an improved adhesion of the corresponding glycidyl ester coatings.

Suitable diols to be used in accordance with I. (b) include but are not limited to ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 2,2,4-trimethyl-1,3-pentanediol, diethylene glycol, triethylene glycol, dipropylene glycol, cis- or trans-1,4-bis(hydroxymethyl)cyclohexane and/or mixtures thereof, ethoxylated hydrogenated bisphenol A, cyclododecanediol, isomer mixtures of bis(hydroxymethyl)tricyclo[5,2,1,0$^{2,6}$]decane, etc. The above-recited diols are used, in accordance with this invention, in amounts of 100–50 molar percent, preferably 95–50 molar percent, and especially 90-60 molar percent.

Suitable aliphatic dicarboxylic acids according to III. (a) include but are not limited to succinic acid, glutaric acid and/or the anhydrides thereof, adipic acid, sebacic acid and azelaic acid. These dicarboxylic acids are used in quantities of 15–40 molar percent, preferably 20–40 molar percent in accordance with the present invention. When smaller amounts of these dicarboxylic acids are employed, the corresponding glycidyl esters yield only brittle coatings, while the use of more than 40 molar percent of such dicarboxylic acids results in glycidyl esters, the coatings of which have only a minor hardness and insufficient corrosion protection activity.

Advantageous aromatic and cycloaliphatic dicarboxylic acids according to III. (b) include but are not limited to phthalic acid, isophthalic acid, hexahydrophthalic acid, hexahydroterephthalic acid, $\Delta^4$-tetrahydrophthalic acid, methylhexahydrophthalic acid, endomethylenetetrahydrophthalic acid, methylendomethylenetetrahydrophthalic acid and 1.x.-cyclodecanedicarboxylic acid ($x = 2$–6) as well as aromatic polycarboxylic acids of more than 2 carboxyl groups, e.g., 1,2,4-benzenetricarboxylic acid and 1,2,4,5-benzenetetracarboxylic acid. These carboxylic acids are preferably utilized in the form of their cyclic anhydrides, but in part also in the form of their alkyl esters. The aforementioned dicarboxylic acids are used in an amount of 85–60 molar percent, preferably 80–60, wherein up to 30 molar percent can be replaced by an aromatic polycarboxylic acid of more than 2 carboxyl groups. With the use of more than 30 molar percent of these aromatic polycarboxylic acids of more than 2 carboxyl groups, glycidyl esters are obtained of an undesirably high viscosity, the coatings of which, though affording a very good corrosion protection, exhibit only minor elasticity.

Suitable anhydrides for the curing of the glycidyl esters of this invention according to (B) include but are not limited to hexahydrophthalic anhydride, methylendomethylenetetrahydrophthalic anhydride, dodecenylsuccinic anhydride, methylhexahydrophthalic anhydride, liquid anhydride mixtures, e.g., as mentioned in DOS No. 2,229,907, and stabilized liquid anhydride mixtures according to DOS No. 2,231,892. The above-mentioned carboxylic acid anhydrides are added in quantities of 0.7 – 1.5 anhydride equivalents per epoxide equivalent of the glycidyl ester and/or the components set forth under (A). When curing with less than 0.7 anhydride equivalents, the ensuing coatings show insufficient corrosion protection due to inadequate crosslinking, and with the use of more than 1.5 anhydride equivalents, coatings are obtained which are too brittle.

The glycidyl esters can also be cured with high-melting carboxylic acid anhydrides, e.g., phthalic anhydride; however, in case of low-solvent content varnish recipes, there is danger of crystallization of the anhydride. The curing reaction of the glycidyl esters with anhydrides takes place according to an additive mechanism; thus, no cleavage products are liberated.

A preferred embodiment of curing the glycidyl esters of this invention is carried out in the presence of conventional catalysts, such as tertiary amines, quaternary ammonium or phosphonium compounds, phenols, aminophenols, e.g., tris(dimethylaminomethyl)phenol, cyclic amines, e.g., imidazole derivatives, such as 1-alkylimidazoles, 2-alkyl-imidazoles, as well as the methyl homologs thereof. The catalysts are generally used in amounts of from 0.01 to 5% by weight, based on the quantity of epoxy resin.

Varnishes can be produced from the binders of this invention by first dispersing pigments and optionally fillers in the glycidyl esters, if desired with the addition of solvents, by means of the processing devices customary in the varnish industry, such as three-roller mills or ball mills, before the curing agent is added in the liquid form. Since the curing reaction takes place only gradually at room temperature, the glycidyl esters can also be directly triturated together with the curing agent, the pigments and optionally other customary varnish adjuvants, e.g., flow agents, wetting agents, anti-ghosting agents, defrothers and, if desired, solvents. These varnishes show only a minor buildup of viscosity and can be processed even after 3–30 days without any further additions of solvents or so-called reactive thinners.

To obtain especially low-viscosity varnishes of a high degree of pigmentation, it is possible to use 5–25% by weight, preferably 5–20% by weight, of solvents, based on the total varnish. Such varnishes can be applied with the usual spraying units at room temperature or slightly elevated temperature.

The thus-produced varnishes can be considered ecologically acceptable in spite of their small solvent content, since the conventional commercial industrial varnishes at present normally contain 40–60% by weight of solvents.

Suitable solvents include but are not limited to aromatic hydrocarbons, ketones, esters and ethers, as well as mixtures of the aforementioned compounds, as they are generally utilized in varnish formulations. Optionally, the solvents can be replaced partially or entirely by so-called reactive thinners, as they are customarily in the epoxy resin technology so that varnishes containing only up to 10% by weight solvent are obtained which are suitable for the preparation of thick-layer varnish coats in one application. Suitable reactive thinners include but are not limited to the monofunctional thinners, such as n-butylglycidyl ether, phenylglycidyl ether, styrene oxide, cresylglycidyl ether and glycidyl esters of $\alpha$-branched, saturated fatty acids as well as bifunctional thinners, such as butanediol diglycidyl ether, hexanediol diglycidyl ether and 1,4-bis(hydroxymethyl)cyclohexane diglycidyl ether. The use of monofunctional thinners should not exceed 20–25% by weight (based on the glycidyl ester), and the addition of bifunctional thinners can be up to 30% by weight, whereas the content of 1,4-bis(hydroxymethyl)cyclohexane diglycidyl ether can be up to 50%.

The varnishes of this invention can be applied, depending on the adjusted viscosity and the time and conditions of applications, by processes known and conventional for the application of liquid varnishes, e.g., by spraying with one-component spraying units, two-component spraying units, with or without a heater, in accordance with the compressed-air, airless, or electrostatic methods, by rolling, pouring, dipping or manual application. The viscosity of the varnishes can be extensively regulated, in addition to using the varnish recipe for this purpose, by the composition of the acidic esters. Thus, a molar percent ratio of the carboxylic acids recited under III. (a) and III. (b) of 30 : 70 to 40 : 60 makes it possible to produce especially low-viscosity glycidyl esters, and thus varnishes of low viscosity on this basis; this can also be attained by using long-chain aliphatic diols and dicarboxylic acids according to I. (b) and III. (a).

The glycidyl esters of this invention can furthermore be added, as upgraders, to other curable polyepoxide compounds, e.g., to the polyglycide ethers of bisphenol A; in the cured products thereof, the esters of this invention effect an increase in elasticity and a greater weathering stability.

The baking conditions of the varnishes of this invention can be varied within wide limits; preferably, baking temperatures are utilized of between 120° and 200° C.; the corresponding baking periods are 30 and 5 minutes, respectively.

The hardness and elasticity of the coatings obtained from the coating compositions of this invention can be adapted almost in any desired way to the respective requirements by the composition of the acidic esters. The same measures which, as explained above, lead to particularly low-viscosity glycidyl esters also result in very elastic, especially impact-elastic coatings, as they are desirable, for instance, for the coating of metallic coil strips. The use of glycidyl esters based on acidic esters of a higher degree of polymerization (9 – 15) likewise leads to very elastic coatings. The impact elasticity can be raised, in particular, also by the use of cycloaliphatic diols according to I. (b), especially by using 1,4-dihydroxymethylcyclohexane, wherein the hardness of the coatings is preserved. The use of branched diols, e.g., 2,2-dimethyl-1,3-propanediol, of a larger proportion of 85–75 molar percent of aromatic dicarboxylic acids, or the use of polycarboxylic acids with more than two carboxyl groups according to III.

(b) results in increased corrosion protection, but the latter cna also be attained by using an excess of 0.2 – 0.5 anhydride equivalents per epoxide equivalent of the curing agent. By the utilization of such measures, one skilled in the art can readily determine the optimum of coating properties for a specific coating problem.

Coatings produced with varnishes prepared from the coating compositions of this invention are distinguished by simultaneously attaining good mechanical properties, excellent weatherability and good corrosion protection. In this connection, the requirements to be met by ecologically acceptable coating compositions are likewise fulfilled.

The varnish coating composition of the present invention generally have a solvent content of less than 25%, preferably 5 – 20% and a viscosity of preferably 5–20% and a viscosity of about 15–250 Sec. (Ford breaker, 4 mm, 20° C), which allows industrial application between 20°–60° C by common methods such as spraying, rolling, dipping or pouring.

The coating materials according to this invention are noted for their good wetting properties on many substrates, especially on metals, glass, etc. With appropriate formulations, such coating materials do not form runners even with little or no thixotropation, and good spreading is always maintained. Therefore, parts having edges, corners and cutouts or varying thickness can be coated uniformly with the coating materials according to this invention.

The good properties exhibited by the cured coatings of the present invention include:

Pendulum hardness according to DIN 53,157 of 100–220 Sec, preferably 150–200 Sec;

Pencil scratch hardness according to Wolff-Wilborn, 2H–8H, preferably 5H–8H;

Elasticity as Erichsen depression according to DIN 53,156 of 5–10 mm, preferably 7–10 mm;

Crisscross cut adhesion value according to DIN 53,151 of Gt 0 – Gt 2, preferably Gt 0 – Gt 1;

Weatherability as 20% loss of gloss with Weather-Ometer of at least 800 hrs. on untreated deep-drawn steel sheets and at least 1,200–1,500 hrs. on pretreated steel sheets (phosphatization: Bonder 120).

The coatings obtained according to this invention are resistant to liquid aliphatic or aromatic hydrocarbons, alcohols, esters and ketones. Also, they are resistant to foodstuffs, such as tomato catsup, fresh or sour milk, lemon juice, oils or fats as well as to acids, such as 10% aqueous solutions of acetic acid, lactic acid, tartaric acid or citric acid. Coatings having contact with such foodstuffs or acids will not show any stains within 24 hrs.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected in degrees Celsius; unless otherwise indicated, all parts and percentages are by weight.

EXAMPLES

(A) Preparation of the Acidic Esters

Ester A

A mixture of 124.1 parts of ethylene glycol, 576.0 parts of 1,4-bis(hydroxymethyl)cyclohexane (mixture of isomers with a trans-proportion of approximately 75%), 268.0 parts of 1,1,1-trimethylolpropane and 584.6 parts of adipic acid is heated under an $N_2$ stream for 2 hours to 140° C., 2 hours to 160° C., 4 hours to 180° C., and then to 190° C., removing 145 parts of water from the reaction mixture. As soon as the reaction mixture has an acid number of below 5 mg. KOH/g., the mixture is cooled to 150° C., and 1303 parts of phthalic anhydride is added. The reaction miture is maintained at 150° C. until the acid number has dropped to 182 mg. KOH/g. The OH-number of the polyester is about 26 mg. KOH/g.

Ester B 248.3 Parts of ethylene glycol, 152.2 parts of 1,2-propanediol, 115 parts of 1,4-bis(hydroxymethyl)cyclohexane (mixture of isomers with about 75% trans-proportion), 160.8 parts of 1,1,1-trimethylolpropane, 467.6 parts of adipic acid and 118.5 parts of phthalic anhydride are condensed at 140°–190° C. as set forth in connection with ester A, removing about 122 parts of water. After reaching an acid number of $\leqq 5$, the mixture is cooled to 150° C. and 1303 parts of phthalic amhydride is added. At 150° C., the reaction is continued until an acid number of 209 mg. KOH/g. has been attained. The OH-number of the ester is about 16 mg. KOH/g.

Ester C 198.6 parts of ethylene glycol, 213.1 parts of 1,2-propanediol, 268.4 parts of 1,1,1-trimethylolpropane and 584.6 parts of adipic acid are condensed as set forth in ester A at 140°–190° C. until an acid number of $\leqq 5$ mg. KOH/g. has been reached. About 140 parts of water is distilled off during this process. After cooling, 1303 parts of phthalic anhydride is added and the mixture is further reacted at 150° C. until the acid number of the polyester is 206 mg. KOH/g. The ester has an OH-number of about 40 mg. KOH/g.

Ester D

The first esterification stage corresponds to that conducted in connection with ester C. In the second stage, 116.8 parts of adipic acid and 1184 parts of phthalic anhydride are added, and the mixture is esterified at 150°–160° C. until an acid number of 206 mg. KOH/g. has been reached, thus obtaining another 13 parts of water. The ester has an OH-number of about 45 mg. KOH/g.

Ester E 310.4 Parts of ethylene glycol, 576.9 parts of 1,4-bis(hydroxymethyl)cyclohexane (mixture of isomers with about 75% trans-proportion), 134.2 parts of 1,1,1-trimethylolpropane and 730.7 parts of adipic acid are condensed as in ester A at 140°–190° C. Upon reaching an acid number of $\leqq 5$ mg. KOH/g., 174 parts of water has been distilled off. At 150° C., 1481 parts of phthalic anhydride is then added, and the reaction is continued at 150° C. until the acid number has dropped to 182 mg. KOH/g. The OH-number of the ester is about 20 mg. KOH/g.

Ester F

720 Parts of 1,4-bis(hydroxymethyl)cyclohexane (mixture of isomers with a trans-proportion of about 75%), 670 parts of 1,1,1-trimethylolpropane and 730.7 parts of adipic acid are esterified at 200° C. until an acid number of $\leqq 5$ mg. KOH/g. has been attained and about 180 parts of water has been distilled off. After adding 1481 parts of phthalic anhydride, the temperature is maintained at 150° C. until the acid number of the ester is 165 mg.KOH/g. The corresponding OH-number is 77 mg. KOH/g.

Ester G

1008 Parts of 1,4-bis(hydroxymethyl)cyclohexane (isomeric mixture with about 75% trans-proportion), 469 parts of 1,1,1-trimethylolpropane, 511.5 parts of adipic acid, 290.7 parts of isophthalic acid and 259.2 parts of phthalic anhydride are condensed at 200° C. until the acid number is smaller than 5 mg. KOH/g. During this procedure, about 220 parts of water is distilled off. At 150° C., the reaction mixture is further reacted, after adding 1036.8 parts of phthalic anhydride, until the acid number of the polyester has dropped to 118 mg. KOH/g. The OH-number is about 50 mg. KOH/g.

Ester H 310.4 Parts of ethylene glycol, 380.5 parts of 1,2-propanediol, 670 parts of 1,1,1-trimethylolpropane, 1023 parts of adipic acid and 444.3 parts of phthalic anhydride are condensed respectively for 2 hours at 140° C., 160° C., 180° C., and then at 200° C., until the acid number is smaller than 5 mg. KOH/g., thus separating 306 parts of water. After adding 1629 parts of phthalic anhydride, the reaction is continued at 150° C. until the acid number of the polyester is 150 mg. KOH/g. The OH-number is about 48 mg. KOH/g.

The esters A through H can likewise be produced in a single-stage condensation process. In contrast thereto, only a two-stage production from the indicated starting components is possible in case of the esters I and K set out below.

Ester I 372.4 Parts of ethylene glycol and 600.7 parts of dimethylhexahydroterephthalate are mixed at 80° C. After the addition of 0.6 ml. of a 10% strength solution of titanium tetraiosopropylate in isopropyl alcohol, the mixture is heated further to 210° C. so that the head temperature of a column attached above the reaction flask does not rise above 70° C., thus distilling off about 192 parts of methanol. After adding 219 parts of adipic acid and 693 parts of hexahydrophthalic anhydride at 150° C., the esterification is continued at 150°-190° C. until an acid number of 200 mg. KOH/g. has been reached. During this step, about 15 parts of water is furthermore distilled off. The polyester has an OH-number of about 10 mg. KOH/g.

Ester K

310 Parts of ethylene glycol, 304 parts of 1,2-propanediol, 134 parts of 1,1,1-trimethylolpropane and 1000 parts of dimethylhexahydrophthalate are condensed, after adding 1 ml. of catalyst solution, as described in connection with ester I, thus distilling off 320 parts of methanol. After adding 511 parts of adipic acid and 1035 parts of phthalic anhydride, the mixture is further esterified at 150° C. until the acid number of the mixture has dropped to 204 mg. KOH/g., separating about 55 parts of water. The OH-number of the ester is about 12 mg. KOH/g.

The following esters represent comparative examples; the degree of polycondensation of these esters is 3.

Ester L

At 110° C., 230.2 parts of glycerol is added to 770 parts of hexahydropthalic anhydride during the course of 10 minutes. The esterification is carried out at this temperature until the ester has an acid number of 281 mg. KOH/g. The OH-number is 134 mg. KOH/g.

Ester M

The esterification of 335 parts of 1,1,1-trimethylolpropane and 770 parts of hexahydrophthalic anhydride is effected at 110°-120° C. The product is an ester having an acid number of 251 mg. KOH/g. and an OH-number of about 120 mg. KOH/g.

Ester N 155.2 Parts of ethylene glycol and 770 parts of hexahydrophthalic anhydride are esterified at 100° C. until an acid number of 307 mg. KOH/g. has been reached. The OH-number of the ester is smaller than 10 mg. KOH/g.

Ester O 155.2 Parts of ethylene glycol and 740.6 parts of phthalic anhydride are esterified at 120°-140° C. The ester has an acid number of 326 mg. KOH/g. and an OH-number of about 20 mg. KOH/g.

Ester P 360 parts of 1,4-bis(hydroxymethyl)cyclohexane (mixture of isomers with a trans-proportion of about 75%) and 740.6 parts of phthalic anhydride are esterified at 150°-200° C. The ester has an acid number of 263 mg. KOH/g. and an OH-number of about 13 mg. KOH/g.

(B) Preparation of the Glycidyl Esters

Glycidyl Ester GA

At 20°-70° C., 1080 g. (3.51 carboxyl equivalents) of ester A is dissolved in 3249 g. of epichlorohydrin (35.1 moles). After the addition of 2.70 g. of tetraethylammonium bromide (0.25%, based on the ester), the mixture is rapidly heated to boiling (about 119°-123° C.). After a vigorous reflux has been developed, 421.7 g. of 50% aqueous sodium hydroxide solution (50% excess) is uniformly added dropwise within about 1.5 hours. The thus-introduced water, and the water formed during the reaction, are removed simultaneously azeotropically by means of epichlorohydrin, and the epichlorohydrin is recycled into the reaction flask after the water has been separated. During the addition of the sodium hydroxide solution, the temperature of the reaction mixture is not to drop below 102° C.; otherwise, the feeding rate of the sodium hydroxide solution is to be slowed down. Thereafter, the mixture is further heated for about 30-60 minutes to remove the last quantities of water. In total, about 290 g. of water is separated. After cooling to room temperature, about 200 g. of fuller's earth is added during the coarse of 10 minutes and the mixture is vigorously agitated. Subsequently, the reaction mixture is filtered, and the precipitate is washed thoroughly with epichlorohydrin; the filtrates are then combined. After the epichlorohydrin has been distilled off at 100-20 torr, the crude product is concentrated for 6-8 hours at 80° C and under 1 torr. Yield: 1215 g. (95% of theory) of glycidyl ester GA.

The properties of the glycidyl ester GA, as well as the glycidyl esters GB through GP on the basis of esters B through P can be seen from Table I set forth below. These glycidyl esters were obtained in accordance with the same process as described in connection with glycidyl ester GA.

Epoxy number determination on glycidyl ester dissolved in chloroform was done by titration in glacial acetic acid in the presence of tetraethyl ammonium bromide (indicator: crystal violet; for details regarding determination please see DIN Draft 53,188). Hydroxide number was determined by quantitative IR Spectroscopy in tetrahydrofuran solution. Molecular weight (number average) was determined by vapor pressure osmosis in chlorobenzene. Chlorine content determination was done according to DIN Draft 53,744, Sh. 10, and viscosity determination according to DIN 53,015. Epoxide functionality (EF) of glycidyl esters was calculated by the following equation:

$$EF = \frac{\text{molecular weight} \times \text{epoxy number}}{100}$$

curing test is effected, on the one hand, according to DIN [German Industrial Standard] 53 157 (pendulum hardness in seconds) and, on the other hand, by determining the so-called pencil scratch hardness with the scratch hardness testing device according to Wolff-Wilborn. The elasticity is measured according to DIN 53 156 (so-called Erichsen depression in mm., maximum value 10 mm.). The adhesion is tested by the crisscross cut value according to DIN 53 151. To make these

TABLE 1
Properties of the Glycidyl Esters

| Ester | Glycidyl Ester | Yield of Glycidyl Ester % of Theo. | EN | OHN | Molecular Weight (Number Average) | EF | % Cl | Viscosity mPas (25° C.) |
|---|---|---|---|---|---|---|---|---|
| A | GA | 95 | 0.230 | 53 | 850 | 1.96 | 1.03 | 470,000 |
| B | GB | 90 | 0.241 | 46 | 790 | 1.90 | 1.27 | 230,000 |
| C | GC | 100 | 0.243 | 61 | 840 | 2.04 | 1.22 | 255,000 |
| D | GD | 95 | 0.233 | 54 | 850 | 1.98 | 1.11 | 200,000 |
| E | GE | 92 | 0.224 | 62 | 780 | 1.75 | 0.78 | 170,000 |
| F | GF | 97 | 0.226 | 92 | 870 | 1.97 | 0.72 | 710,000 |
| G | GG | 97 | 0.167 | 77 | 1200 | 2.00 | 1.08 | >2,000,000 |
| H | GH | 95 | 0.209 | 65 | 1100 | 2.30 | 1.00 | 1,240,000 |
| I | GI | 94 | 0.252 | 39 | 680 | 1.72 | 1.38 | 16,000 |
| K | GK | 97 | 0.235 | 48 | 720 | 1.64 | 1.26 | 110,000 |
| L | GL | 99 | 0.302 | 171 | 620 | 1.87 | 1.18 | 43,000 |
| M | GM | 90 | 0.326 | 130 | 620 | 2.02 | 0.72 | 550,000 |
| N | GN | 97 | 0.367 | 60 | 470 | 1.71 | 1.17 | 9,800 |
| O | GO | 100 | 0.305 | 90 | 500 | 1.53 | 1.91 | 120,000 |
| P | GP | 94 | 0.290 | 27 | 660 | 1.92 | 1.48 | >2,000,000 |

EN = Epoxy Number (= epoxide equivalent/ 100 g.)
OHN = OH-Number (mg. KOH/g.)
EF = Epoxide Functionally (= epoxide equivalent/mole)

(C) Preparation of the Varnishes and Coatings

General Varnish Recipe

An approximately 70% solution of a glycidyl ester in xylene/ethyl glycol acetate (1 : 2) is combined, after adding 1% of a 10% strength solution of a flow agent on silicone resin basis in ethyl glycol acetate [based on the solid matter = binder (glycidyl ester + anhydride) + pigment], with a 25% excess of hexahydrophthalic anhydride and 75% (based on the binder) of aftertreated rutile as the pigment; the mixture is triturated on a one-roller mill. The mixture is combined, 0.5 hour before application, under intense agitation with 1% 2-ethylimidazole (based on the glycidyl ester) dissolved in ethyl glycol acetate to form a 20% solution. The varnish is baked after application for 15 minutes at 180° C.

As an example, the recipe of Example 1 is set forth below:

| | | |
|---|---|---|
| 33.0 | parts of | glycidyl ester GA |
| 14.2 | " | xylene/ethyl glycol acetate (1 : 2) |
| 35.7 | " | rutile (aftertreated) |
| 14.6 | " | hexahydrophthalic anhydride |
| 0.8 | " | flow agent on silicone oil basis, 10% strength in ethyl glycol acetate |
| 1.7 | " | 2-ethylimidazole, 20% strength in ethyl glycol acetate/xylene (2 : 1) |
| 100.0 | parts | |

The viscosity of this varnish is 81 sec. (4 mm., Ford beaker, 25° C.). With a solvent content of 20%, an efflux time of 32 seconds results, and with a solvent content of 11.5%, the efflux time is 150 seconds.

For testing purposes, the enamel is applied to degreased, not pretreated deep-drawn steel sheets normally of a thickness of 1 mm. and glass plates (thickness 5 mm.), and then baked. The baking conditions can be varied between 20 minutes at 140° C. and 10 minutes at 180° C. without yielding considerable differences in the coating properties. The layer thickness of the films on which the test is conducted is normally 40-50 μ. The conditions even stricter, the two parallel groups of cutting lines are arranged at an acute angle of 45° to one another; furthermore, a commercially available, transparent adhesive strip is glued over the cutting lines and then suddenly torn off (measuring values Gt 0 to Gt 4). The weatherability was tested by means of a weather-Ometer with xenon lamp, type 60 W (firm Brabender) at a blackbody temperature of 45° C. with the 17/3 cycle (17 minutes of exposure to light, 3 minutes of rain spray). The test was interrupted upon the occurrence of a 20% loss of gloss [lustre]. The gloss was determined under an angle of incidence of 45° according to Lange. Before the beginning of the light exposure, the gloss value of the coating was above 80%.

The examples and results listed in Table 2 were obtained analogously to the above-mentioned general varnish recipes. The glycidyl esters of this invention (Example 1-10) have, as compared to the comparative examples (Examples 11-17), a considerably higher elasticity and, in most cases, also an improved adhesion with practically the same hardness. While the weatherability of the glycidyl esters set forth as comparative examples (Examples 11-15) is equivalent to that of the glycidyl esters of this invention, the bisphenol A - bisglycidyl ethers (Examples 16 and 17) are markedly inferior with respect to this property. Furthermore, the coatings of this invention are distinguished by an excellent water resistance and corrosion protection effect.

Varnishes prepared in accordance with the above enamel recipe with the glycidyl esters of this invention can be processed, in general, according to the rolling methods, even with a minor solvent content when using especially low-viscosity glycide esters (e.g. GB, GI, GK). Low-viscosity varnishes which are applicable by spraying can be prepared with similar solvent contents as in the indicated varnish recipe (about 15%) by using the glycidyl esters having a lower viscosity (especially GI and GK). Finally, the utilization of methylhexahydrophthalic acid anhydride or anhydride mixtures in place of hexahydrophthalic anhydride results in a marked reduction in viscosity as well. The viscosity of the varnishes can furthermore be affected by the quantity of pigment, the amount of anhydride, as well as by the usual varnish adjuvants.

Varnishes having a lower solvent content and being particularly harmless to the environment can be prepared with the use of reactive thinners. Two varnish recipes, using as example the relatively highly viscous glycidyl ester GA, shown that it is possible in this way to obtain varnishes which are almost completely free of solvent and can be sprayed at 25°–30° C., and which likewise result in weather-resistant coatings of a high quality. The results of these tests are tabulated in Examples 18 and 19 following Table 2.

described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In an epoxy resin based liquid varnish coating composition whose binder comprises one or more cyclic anhydrides of saturated and/or unsaturated aliphatic and/or cycloaliphatic dicarboxylic acids, or a mixture consisting essentially of carboxylic acid anhydrides of saturated and/or unsaturated aliphatic and/or cycloaliphatic and aromatic dicarboxylic acids, wherein the

TABLE 2

Properties of Glycidyl Ester Coatings

| Example | Glycidyl Ester | Pendulum Hardness sec. | Scratch Hardness | Erichsen Depression mm. | Crisscross Cut Value | Weather-Ometer Test hr. |
|---|---|---|---|---|---|---|
| 1 | GA | 179 | 7H | 9.9 | Gt 0 | 1,400 |
| 2 | GB | 177 | 6H | 8.9 | Gt 1 | 1,100 |
| 3 | GC | 172 | 8H | 9.0 | Gt 1 | 900 |
| 4 | GD | 163 | 7H | 8.9 | Gt 0 | 1,000 |
| 5 | GE | 157 | 5H | 9.6 | Gt 0 | 1,100 |
| 6 | GF | 195 | 5H | 10.0 | Gt 0 | 1,000 |
| 7 | GG | 178 | 5H | 7.3 | Gt 1 | 900 |
| 8 | GH | 170 | 5H | 9.9 | Gt 0 | 1,100 |
| 9 | GI | 130 | 7H | 10.0 | Gt 0 | 800 |
| 10 | GK | 170 | 7H | 9.3 | Gt 0 | 1,000 |
| 11 | GL | 186 | 8H | 0.5 | Gt 3–Gt 4 | 1,200 |
| 12 | GM | 193 | 8H | 0.6 | Gt 3 | 1,000 |
| 13 | GN | 184 | 8H | 1.2 | Gt 0 | 900 |
| 14 | GO | 197 | 8H | 0.5 | Gt 3–Gt 4 | 900 |
| 15 | GP | 197 | 8H | 1.5 | Gt 3 | 1,000 |
| 16 | Bisphenol A - bis-glycidyl-Ether (1) | 208 | 7H | 3.8 | Gt 1 | 100 – 350 (3) |
| 17 | " (2) | 205 | 5H | 3.8 | Gt 1 | 300 – 400 (3) |

Baking Conditions: 15 Minutes at 180° C.
(1) "Epikote" 828, EN = 0.52. To improve elasticity, only 0.9 anhydride equivalents were used in Example 16 per epoxide equivalent.
(2) "Epikote" 1001, EN = 0.21. A varnish according to the general varnish recipe with solvent contents of 15–30% could hardly be applied due to its high viscosity. In this example, equivalent amounts of anhydride were utilized.
(3) Upper and lower measuring values in several measurements. In addition to strong chalking, a marked yellowing was observed, only in case of these examples, at the same time.

|  | Example 18 | Example 19 |
|---|---|---|
|  | Parts by Wt. | Parts by Wt. |
| Glycidyl ester GA | 28.0 | 14.5 |
| Bisglycidyl ether of 1,4-bis(hydroxymethyl)cyclohexane, EN = 0.6 | — | 8.7 |
| n-Butylglycidyl ether | — | 5.8 |
| Monoglycidyl ester of α-branched saturated fatty acid ($C_{8-10}$) | 7.0 | — |
| Xylene/ethyl glycol acetate (1 : 2) | 8.0 | 3.2 |
| Rutile (aftertreated) | 39.7 | 40.7 |
| Hexahydrophthalic anhydride | 15.0 | — |
| Methylhexahydrophthalic anhydride | — | 25.3 |
| Flow agent on silicone oil basis, 10% in xylene/ethyl glycol acetate (1 : 2) | 0.9 | 0.8 |
| 2-Ethylimidazole, 20% in ethyl glycol | 1.4 | 1.0 |
|  | 100.0 | 100.0 |
| Efflux times (4 mm. Ford beaker, 20° C.): | 113 seconds | 82 seconds |

Varnishes applicable according to the rolling method can be produced completely without any solvent with the use of reactive thinners.

The preceding examples can be repeated with similar success by substituting the generically and specifically melting point of the anhydride or anhydride mixture is below 100° C., the improvement wherein the coating composition contains at most up to 25% volatile solvent and the binder is a mixture of A) glycidyl esters and B) one or more of said anhydrides, in a ratio such that the binder contains 0.7 –1.5 anhydride equivalents per epoxide equivalent of glycidyl ester, wherein the glycidyl esters have 1.6 – 2.8 epoxide equivalents/mole, an epoxy number of 0.1 – 0.35 epoxide equivalents/100 g., a hydroxyl number of 20–130 mg. KOH/g. and a number average molecular weight of 600–2000 and are prepared by glycidylating an esterification product containing free carboxyl groups with a molar excess of a 2,3-epoxyhaloalkane in the presence of an agent which splits off hydrogen halide, said esterification product having an acid number of 60–220 mg. KOH/g., a hydroxyl number of 0–100 mg. KOH/g., an average molecular weight of 550–1800 and an average degree of polymerization of 4.8–15, and wherein the esterification product is prepared by condensing a reaction mixture consisting essentially of:

(a) 100–50 molar percent of at least one aliphatic or cycloaliphatic diol wherein the hydroxyl functions are separated from each other by 2–12 carbon atoms and 0–2 of said carbon atoms are substituted by an oxygen atom which oxygen atoms when present are separated by at least 2 carbon atoms from each other and from the hydroxyl groups, and correspondingly 0–50 molar percent of at least one aliphatic polyol of 3–6 carbon atoms and 3 or 4 hydroxyl groups; and (b) a mixture of 15–40 molar percent of at least one saturated aliphatic dicarboxylic acid of 4–12 carbon atoms or an intramolecular anhydride thereof, and correspondingly 85–60 molar percent of at least one aromatic or cycloaliphatic dicarboxylic acid other than terephthalic acid of 6–12 ring carbon atoms or an intramolecular anhydride thereof, or a corresponding mixture thereof and up to 30 molar percent of an aromatic polycarboxylic acid having 3 or more carboxyl groups or an intramolecular anhydride thereof.

2. A composition according to claim 1 wherein (a) consists essentially of said diols.

3. A composition according to claim 1 wherein (a) includes 5–50 molar percent of said aliphatic polyol.

4. A composition according to claim 1 wherein (b) consists essentially of said saturated aliphatic dicarboxylic acid and said aromatic or cycloaliphatic dicarboxylic acid.

5. A composition according to claim 1 wherein (b) contains 5–30 molar percent of said aromatic polycarboxylic acid of 3 or more carboxyl groups or an intramolecular anhydride thereof.

6. A composition according to claim 1 wherein said glycidyl ester contains 1.8–2.2 epoxide equivalents/mole and has an epoxy number of 0.15–0.28 epoxide equivalents/100 g., a hydroxyl number of 30–80 mg. KOH/g. and a molecular weight of 650–1500.

7. A composition according to claim 1 containing 5–20% volatile solvent and wherein (B) is hexahydrophthalic anhydride.

8. A composition according to claim 1 wherein the 2,3-epoxyhaloalkane employed to produce the glycidyl esters is epichlorohydrin.

9. A composition according to claim 1 wherein (b) is a mixture of adipic acid and phthalic anhydride or isophthalic acid or hexahydrophthalic acid, wherein the diol of (a) is one or more of ethylene glycol, 1,2-propanediol and 1,4-bis(hydroxy-methyl)-cyclohexane, and wherein the polyol of (a) is 1,1,1-trimethylolpropane.

10. A composition according to claim 1 wherein the solvent content is 5–20%, wherein the 2,3-epoxyhaloalkane employed to produce the glycidyl esters is epochlorohydrin, and wherein (b) is a mixture of adipic acid and phthalic anhydride or isophthalic acid or hexahydrophthalic acid, wherein the diol of (a) is one or more of ethylene glycol, 1,2-propanediol and 1,4-bis(-hydroxymethyl)-cyclohexane, and wherein the polyol of (a) is 1,1,1-trimethylolpropane.

* * * * *